Nov. 20, 1934.   J. G. SHODRON   1,981,433
METHOD FOR STORING AND DISPENSING FEED
Filed Oct. 14, 1932    5 Sheets-Sheet 1
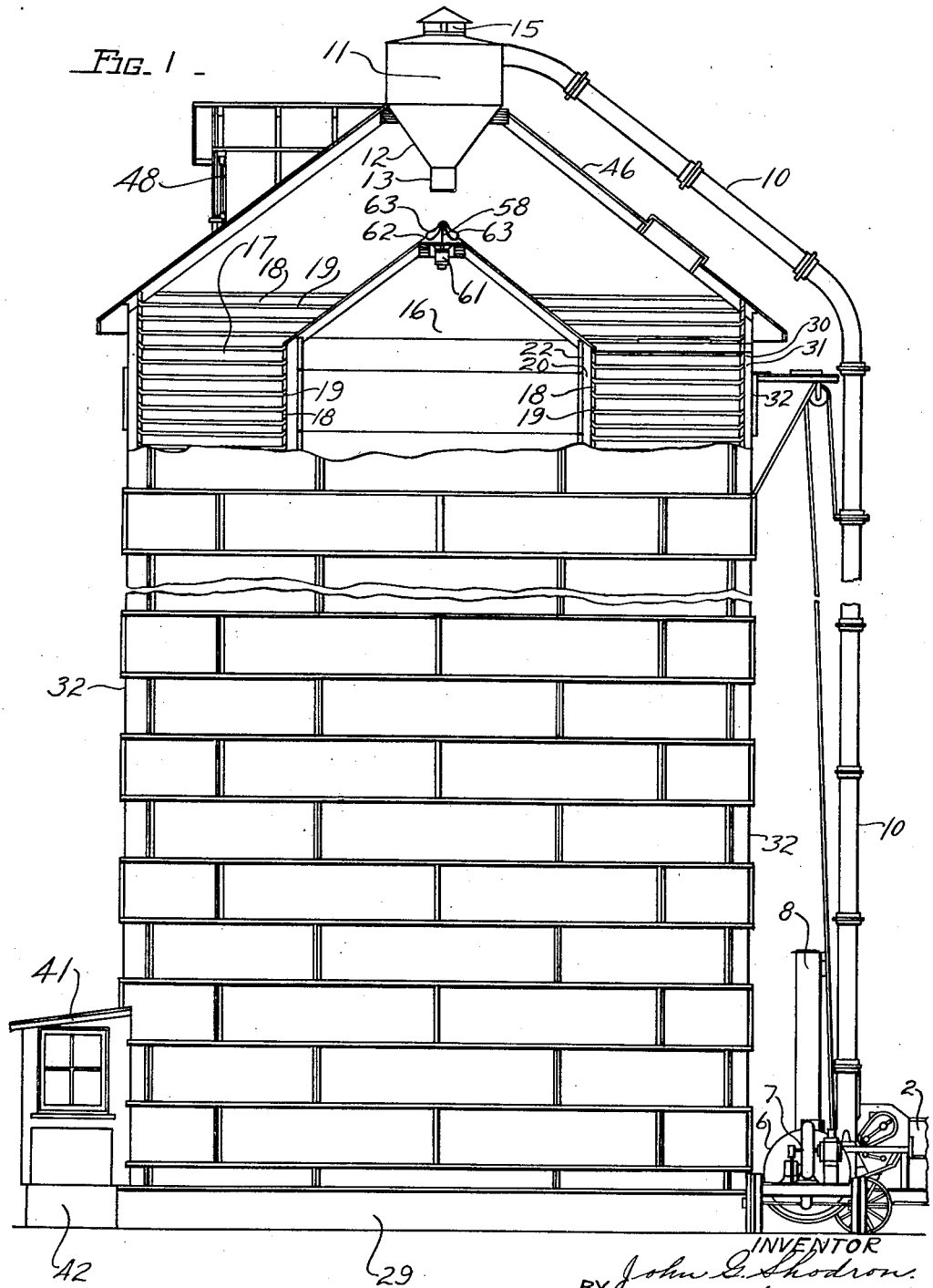

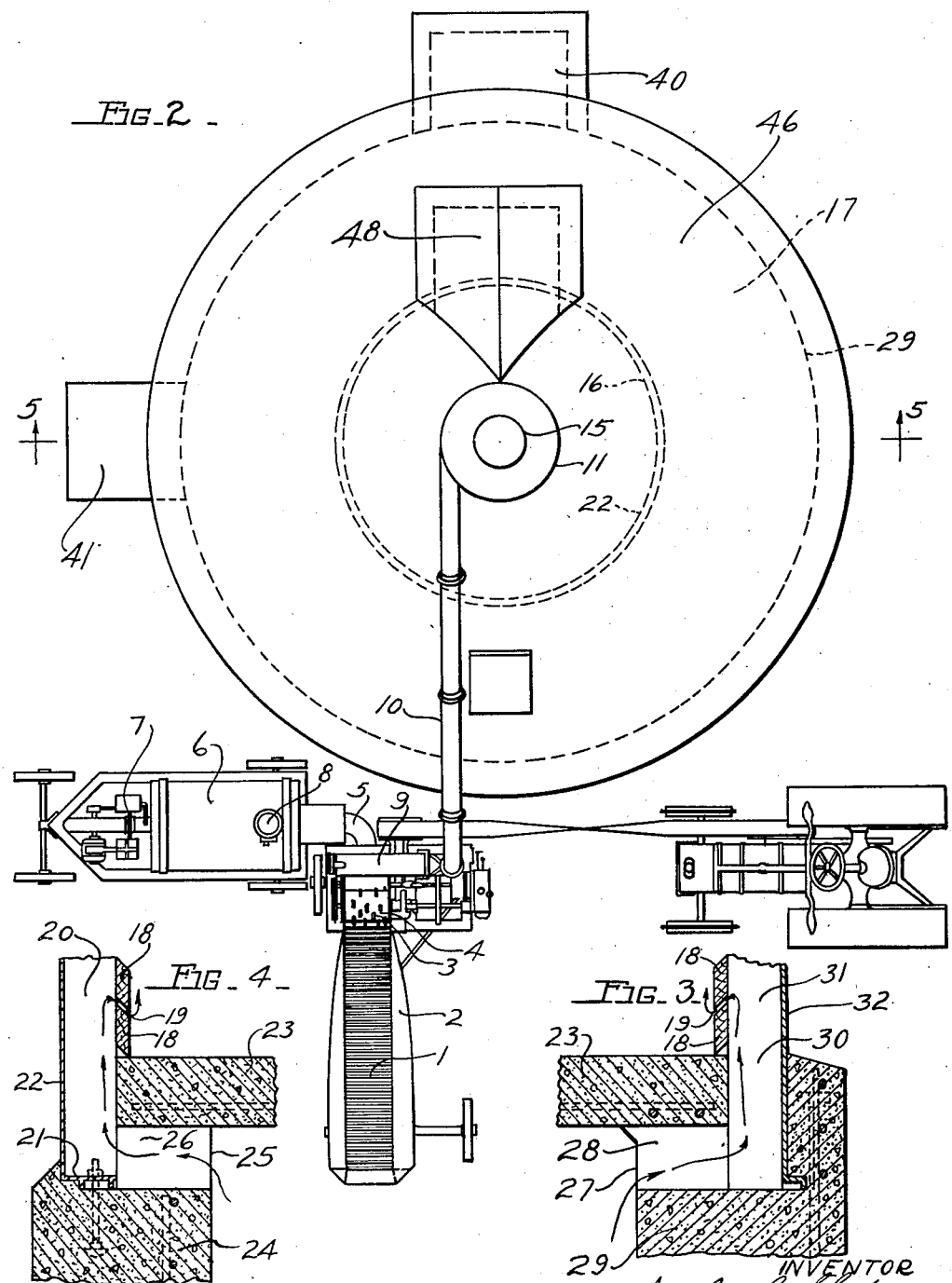

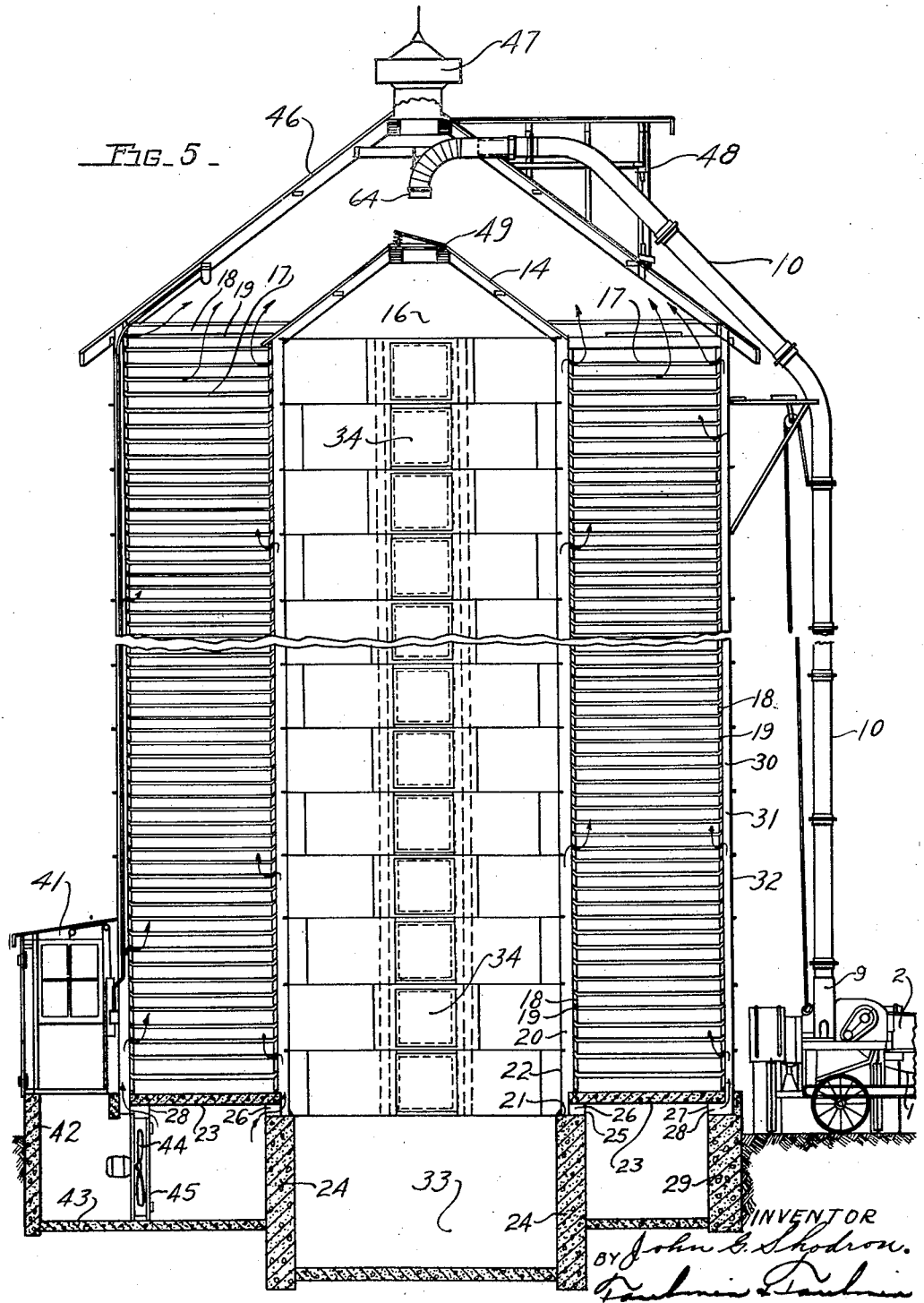

Nov. 20, 1934.   J. G. SHODRON   1,981,433
METHOD FOR STORING AND DISPENSING FEED
Filed Oct. 14, 1932   5 Sheets-Sheet 4
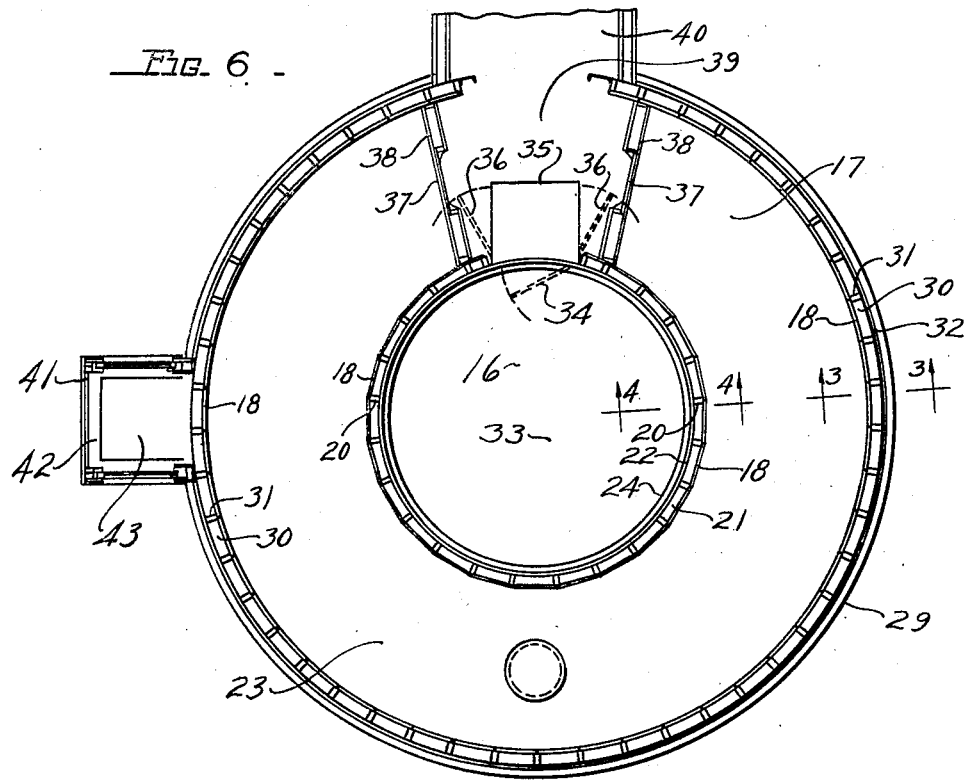
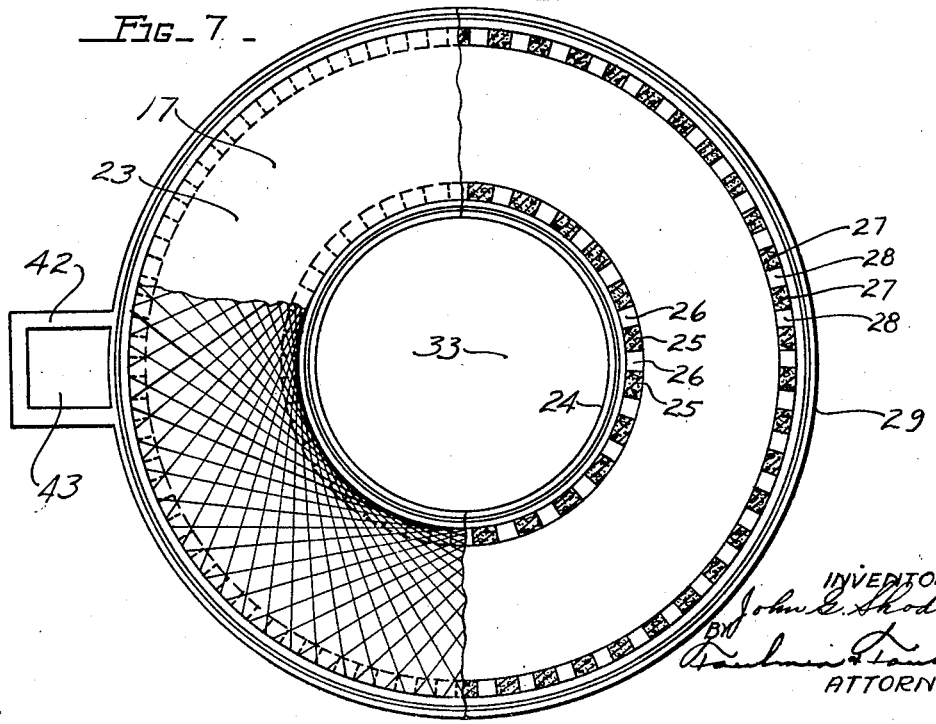

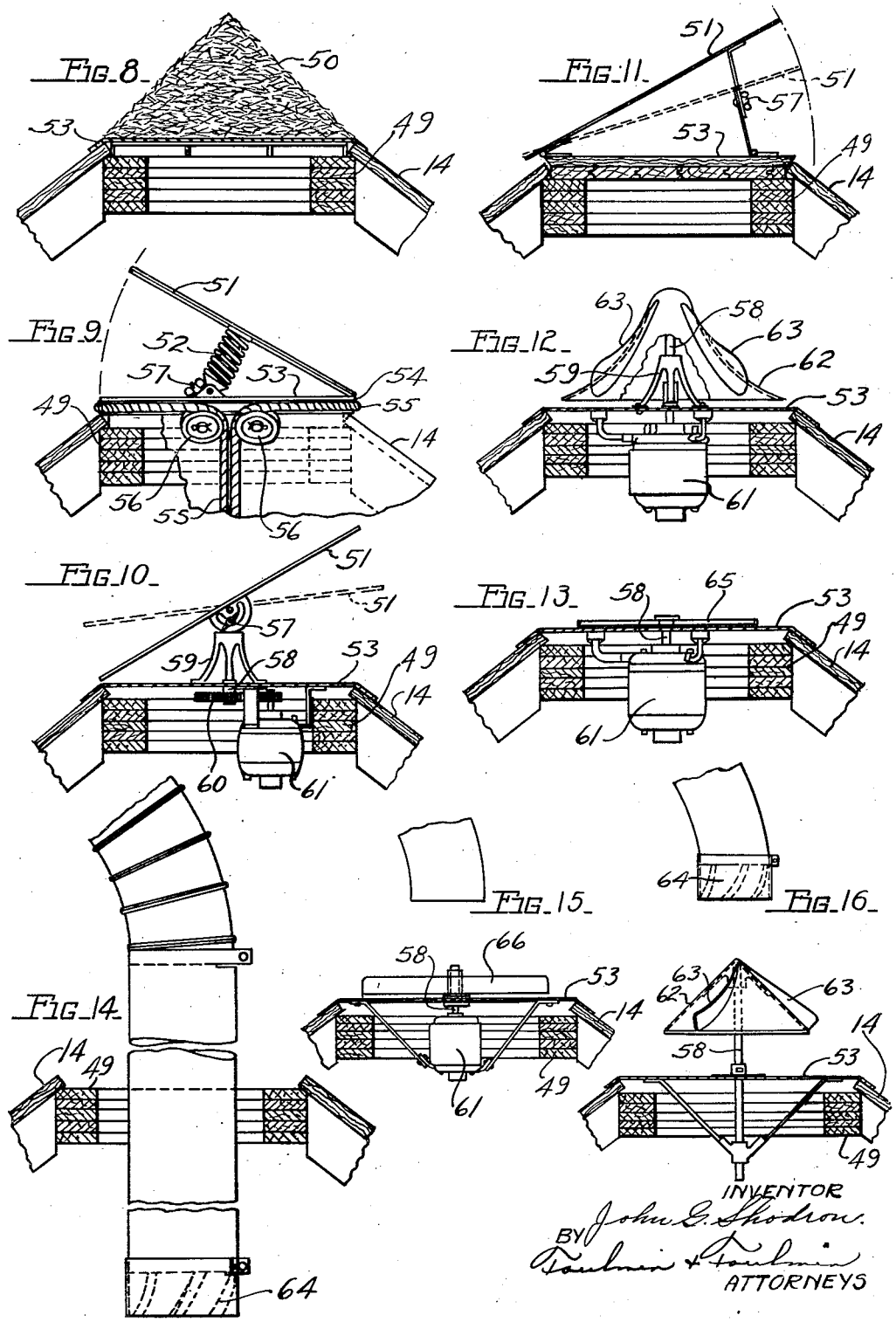

Patented Nov. 20, 1934

1,981,433

UNITED STATES PATENT OFFICE 1,981,433

METHOD FOR STORING AND DISPENSING FEED

John G. Shodron, Fort Atkinson, Wis., assignor to James Manufacturing Company, Fort Atkinson, Wis., a corporation of Wisconsin Application October 14, 1932, Serial No. 637,818

7 Claims. (Cl. 99—5)

My invention relates to a method and apparatus for the storing, curing and handling of hay.

In particular, my invention has for its object the provision of means for continuously ventilating the hay in all parts of the hay to prevent spontaneous combustion and to carry away combustible gases which may be ignited by spontaneous combustion or by electricity, such as lightning.

It is a further object of my invention to provide a novel construction for such ventilation purposes in combination with a silo.

It is a further object of my invention to provide for the storing of chopped hay with or without a dust collector and of ventilating the chopped hay.

It is a further object of my invention to provide a combined segmental metal container for the chopped hay, a false wall of wood or metal which may be easily assembled and constructed which would permit of the circulation of air without the exit of the hay through the false wall and the combination with such false wall of the interior supporting wall of the silo or chute.

It is a particular object of my invention to provide means of distributing the hay, particularly chopped hay, evenly within the hay container on the outside of the silo or a chute.

It is my object to provide a method and apparatus by which the hay is chopped, blown to a point adjacent the hay container, the dust and like particles in the hay extracted in a centrifugal collector, the major portion of the hay, which is heavier, extracted and delivered by gravity to the hay container and there distributed either by gravity or by mechanical means evenly throughout the hay container.

It is a further object of my invention in this connection to provide means of heating the hay when it is thus chopped to cure it and dry it prior to the delivery into the centrifugal collector for the extraction of dust and other foreign material of like character.

Referring to the drawings:

Figure 1 is a side elevation partially in section of the hay container, silo, heating and delivery mechanism and the dust collector;

Figure 2 is a top plan view thereof;

Figure 3 is a detail section through the outer wall of the container and its false wall showing the air inlet passageway, on the line 3—3 of Figure 6;

Figure 4 is a similar view showing the inner false wall and the inner supporting wall which is the silo wall, on the line 4—4 of Figure 6;

Figure 5 is a section on the line 5—5 of Figure 2;

Figure 6 is a top plan view of Figure 5 with the roofs removed;

Figure 7 is a plan view of the foundation partially in section showing the arrangement of the ventilation blocks and of the reinforcing rods for the foundation plate;

Figure 8 indicates how the chopped hay accumulates on top of the roof of the silo which makes it difficult for the securing of a perfect distribution of the chopped hay around the silo in the hay container;

Figure 9 is a section through one form of hay distribution mechanism;

Figure 10 is a side elevation partially in section of another form;

Figure 11 is a side elevation of an adjustable form partially in section;

Figure 12 is a side elevation partially in section of a motor driven form;

Figure 13 is a side elevation partially in section of a motor driven form having a centrifugal flat blade;

Figure 14 is a detail view of the delivery chute showing the form of spiral delivery mouth to give a rotary movement to the hay making its exit;

Figure 15 is a side elevation partially in section of the delivery spout mouth and its associated motor driven impeller for distributing the hay;

Figure 16 is a similar view showing the employment of a cone for distribution of the hay in combination with the impeller blades.

Referring to the drawings in detail, the hay is gathered from the field in the usual manner and conveyed to an endless belt 1 between the side boards 2. It is moved into a chopping machine by the fingers 3 on the drum 4 and, after being chopped, it is delivered to the pipe 5 through the drum 6 where it is circulated and heated. By so heating it, a considerable portion of the moisture remaining in the day is driven out and it is thus cured.

The drum 6 is heated by any desired means, such as by an oil burner, generally indicated at 7. 8 indicates a thermostatic damper for controlling the temperature of the air inside the drum 6. The hay thus heated is discharged into the suction side of the blower 9 whence it is delivered by the blower through the pipe 10 into the centrifugal collector 11 in which the heavy material which constitutes the usable portion of the hay is collected centrifugally and delivered downwardly through the tapering cone 12 and spout 13 by gravity on to the roof 14 of the silo 16. The excessive air, together with the dust, chaff and other like material, passes out through the top opening 15 of the centrifugal collector 11. Thus, the hay is chopped, cured, dried, cleaned and then delivered into the hay container. The delivery at this point may be facilitated by placing in the mouth of the spout 13, where the collector 11 is used as in Figure 1, or is not used as in Figure 5, a means to impart a helical movement to the hay making its exit as shown in Figure 14.

The exact details of this distribution mechanism will be hereinafter described.

The hay thus distributed is delivered into the space designated 17 between the false walls, formed by a plurality of overlapping spaced members, such as the boards 18 that provide between themselves the spaces 19 that extend downwardly and inwardly so that the chopped hay cannot leak outwardly but the air delivered through the passageways 19 can enter the hay mass and proceed laterally and upwardly through the hay mass. These transverse overlapping boards are mounted on studding 20 which are arranged at spaced intervals and are retained in position upon the annular surface 21 of the silo wall 22 which is preferably made of segmental sheets of metal that are bolted or welded together. The lower board 18 rests upon the foundation floor 23 which is spaced above the foundation center wall 24 by a series of spaced blocks 25 which thus provide air passageways 26 between them. The air between these passageways enters between the studding 20 and thence passes through the openings 19 and into the hay mass. Likewise, the outer end of the floor 23 is mounted on blocks 27 which form air passageways 28 beneath the floor 23 and over the foundation wall 29 to the space 30 between the outer studding 31 which rest against the outer wall 32. These outer studding are provided with a similar false wall of boards 18 having passageways 19 for delivery of air into the hay. The outer wall 32 may be made of any desirable material but is preferably made of segmental sheets as indicated. The central foundation 24 is the silo pit and is of concrete arranged as shown at 33. The silo is provided with a plurality of doors 34 which enter into the delivery chute 35.

This delivery chute has doors 36 on the sides to permit of access through doors 37 in the partitions 38 to the hay in the space 17. The passageway 39 into which the ensilage and hay may be discharged communicates with a horizontal passageway 40 that leads to a suitable barn in which the feed is delivered for feeding of the stock.

On one side of the structure is formed a house 41 which rests upon the outer foundation 42. This house has no floor except the floor 43 of the foundation. This floor 43 forms with the floor 23 a cellar room into which outside fresh air is introduced through the house 41 by a fan 44 in the partition 45. Such a fan is not essential but it is very desirable in insuring a thorough circulation of outside air into the cellar room and thence through the passageways 26 and 28.

By using a metal silo and a metal hay container, I am enabled to provide adequate conductors for electricity and easily erected standard structures which may be easily manufactured at a factory and erected on a farm by welding or bolting. Wooden boards 18 provide a cheap and satisfactory method of preventing the hay from leaking into the air space between the false wall and the main wall while, at the same time, permit of a very large amount of air circulation.

It will be noted that the hay mass should not be thicker at any point than such a thickness which would permit of such free circulation of air.

On the silo is a roof 14 and on the hay container is a roof 46.

If the centrifugal collector 11 is not employed, this roof is provided with a ventilator 47 and a dormer window 48 through which the hay delivery pipe 10 may be introduced into the interior of the container.

It will be observed that, upon the removal of the door 49 in the top of the roof 14 of the silo, the same delivery pipe can be used for delivery into the silo. Thus, a common delivery mechanism will alternately deliver ensilage and hay. The provision of the hay around the outside of the silo prevents the freezing of ensilage, which is a very desirable factor in winter time. The hay heater may be a temporary affair, as indicated, and removable from the structure, or it may be a permanent arrangement by which after the hay is heated and delivered into the hay container, hot air may be delivered into the hay chamber by this mechanism for further curing and drying of the hay in combination with the circulatory system heretofore described.

Referring to the particular methods of distributing the hay when discharged into the hay container, it was found that the hay, which is chopped in pieces from one to four inches in length, has a tendency to pile, as in Figure 8, in the pile marked 50. This results in irregular distribution of the hay. Consequently, it is often impossible to get the free circulation of the air through the hay unless it is evenly distributed as it is placed in the container. To overcome this difficulty, it is desirable to provide some means of directing the chopped hay laterally over the roof of the container. This is effected by an adjustable plate 51 shown in Figures 9, 10 and 11. In Figure 9 this plate is self adjusted by the use of the spring 52. The plate 51 is hinged upon a platform 53 having a grooved edge 54 to form a pulley. This pulley carries a rope 55 guided by the pulleys 56 for rotating the plate and, therefore, placing the hinged plate 51 at different angles. As the chopped hay drops down on the plate 51 the burden is yieldingly accommodated by the spring 52. The plate 51 constantly moves as a result of the yielding of the spring 52 and the chopped hay is delivered laterally over the roof 14.

In Figure 10 there is provided a similar plate 51 which is adjustable at any angle by the set screw 57. In this case the plate 51 is carried on a shaft 58 in a bracket 59 mounted on the platform 53. Beneath the platform 53 is a train of gears 60 which are actuated by a motor 61 so that the plate 51 when adjusted at the desired angle will rotate to distribute the hay as it descends through the opening 13. In Figure 11 is shown a similar construction without the feature of rotating the adjustable plate 51.

In Figures 12, 13, 15 and 16 are shown various forms of rotary stirrers or impellers which act as distributors. The motor 61 suspended to the plate 53 operates, as heretofore described, the shaft 58. This shaft carries a cone 62 having the fins 63 which act as impeller blades for the distribution of the chopped hay.

In Figure 16 a similar construction is provided without the use of a motor as it has been found that such a construction, particularly in combination with the stationary guide vanes 64 at the mouth of the spout, as in Figure 14, will give a rotary movement to the hay mass which will distribute it evenly.

Figures 13 and 15 provide impeller arms that are secured in Figure 13 as at 65, or flat vertical arms as at 66 in Figure 15.

In any event, in all of these forms the principle is the same of adjusting the receiving surface for the falling hay, deflecting it laterally and, in some instances, giving it a helical movement for even distribution throughout the hay chamber.

It will be understood that I desire to comprehend within my invention such modifications as may be necessary to adapt it to varying conditions and uses.

Having thus fully described my invention, what I claim as new and desire to secure by Letters Patent, is:

1. In a method of curing and storing hay, heating the hay, extracting dust and foreign material from the hay by a draft of air to partially cure the hay, storing the hay in a comparatively thin vertically arranged mass in a container having foraminous walls and permitting air to pass through the walls and through all portions of the hay.

2. In a method of curing and storing hay, gathering and chopping the hay while still having a moisture content, heating the hay to partially cure the hay while in chopped condition, storing the hay in a comparatively thin vertically arranged mass in a container having foraminous walls, and permitting air to pass through the walls and through all sides of the hay.

3. In a method of curing and storing hay, collecting the hay while still having a moisture content, chopping it, drying it, cleaning, storing the hay in a comparatively thin vertically arranged mass in a container having foraminous walls, and forcing air through the walls and through all sides of the hay during storage.

4. In a method of curing and storing hay, collecting hay, chopping it, subjecting it to heat while it is chopped, thereafter blowing it and while being so blown imparting to it a rotary movement for the extraction of foreign material therefrom, depositing the clean chopped hay by gravity to form a hay mass, and thereafter circulating throughout the entire hay mass air so as to control the temperature of the hay mass so dried and cleaned.

5. In a method of curing and storing hay, collecting hay, chopping and at the same time subjecting the hay to heat, thereafter blowing the hay and imparting thereto a rotary movement for the extraction of foreign material therefrom, and depositing the clean chopped hay by gravity to form a hay mass.

6. In a method of curing and storing hay, chopping the hay, heating the chopped hay to partially cure the hay, and causing the heated and chopped hay to travel in a spiral path, whereby foreign materials are extracted therefrom and storing the hay in a comparatively thin vertically arranged mass in a container having foraminous walls, and permitting air to pass through the walls and through all portions of the hay during storage.

7. In a method of curing and storing hay, reducing the hay to small particles, heating the hay thus reduced to partially cure the hay, and applying air to the heated hay, whereby it will move in a spiral path and foreign materials be removed therefrom and storing the hay in a comparatively thin vertically arranged mass in a container having foraminous walls, and permitting air to pass through the walls and through all portions of the hay during storage.

JOHN G. SHODRON.